(12) United States Patent
Princen

(10) Patent No.: US 11,800,874 B2
(45) Date of Patent: Oct. 31, 2023

(54) COMPOSITION COMPRISING A SELECTIVE HERBICIDE AND AN ALGAL EXTRACT, USE OF AN ALGAL EXTRACT FOR DETOXIFYING PLANTS SUBJECTED TO TREATMENT WITH A SELECTIVE HERBICIDE

(71) Applicant: LABORATOIRES GOËMAR, Saint Malo (FR)

(72) Inventor: Jean-Pierre Princen, Saint Malo (FR)

(73) Assignee: LABORATOIRES GOËMAR, Saint Malo (FR)

(*) Notice: Subject to any disclaimer, the term of this patent is extended or adjusted under 35 U.S.C. 154(b) by 320 days.

(21) Appl. No.: 15/112,755

(22) PCT Filed: Jan. 23, 2015

(86) PCT No.: PCT/FR2015/050162
§ 371 (c)(1),
(2) Date: Jul. 20, 2016

(87) PCT Pub. No.: WO2015/110763
PCT Pub. Date: Jul. 30, 2015

(65) Prior Publication Data
US 2016/0345589 A1 Dec. 1, 2016

Related U.S. Application Data

(60) Provisional application No. 61/931,067, filed on Jan. 24, 2014.

(30) Foreign Application Priority Data

Jan. 24, 2014 (FR) ..................................... 14 50622

(51) Int. Cl.
| | | |
|---|---|---|
| *A01N 65/03* | (2009.01) | |
| *A01N 57/20* | (2006.01) | |
| *A01N 43/50* | (2006.01) | |
| *A01N 43/10* | (2006.01) | |
| *A01N 59/00* | (2006.01) | |

(52) U.S. Cl.
CPC ............. *A01N 65/03* (2013.01); *A01N 43/10* (2013.01); *A01N 43/50* (2013.01); *A01N 57/20* (2013.01); *A01N 59/00* (2013.01)

(58) Field of Classification Search
CPC ........ A01N 59/00; A01N 65/03; A01N 59/16; A01N 43/10; A01N 43/50; A01N 57/20; A01N 25/32
USPC ......................................................... 504/117
See application file for complete search history.

(56) References Cited

U.S. PATENT DOCUMENTS

| | | | |
|---|---|---|---|
| 4,897,266 A | 1/1990 | Herve et al. | |
| 5,569,639 A * | 10/1996 | Beestman | A01N 57/20 504/128 |
| 8,491,692 B2 * | 7/2013 | Anderson | A01N 25/00 71/8 |
| 2007/0197386 A1 * | 8/2007 | Diebold | A01N 37/32 504/130 |
| 2010/0093715 A1 * | 4/2010 | Voeste | A01N 61/00 514/229.2 |
| 2014/0011675 A1 * | 1/2014 | Knochenmus | C05F 11/00 71/21 |
| 2014/0143909 A1 * | 5/2014 | Greenshields | C05G 3/00 800/298 |

FOREIGN PATENT DOCUMENTS

| | | | |
|---|---|---|---|
| EP | 0 218 770 | 4/1987 | |
| EP | 0 538 091 | 4/1993 | |
| EP | 0538091 A1 * | 4/1993 | ............. A01N 65/00 |
| WO | 84/02652 | 7/1984 | |
| WO | WO-9306730 A1 * | 4/1993 | ............. A01N 65/00 |
| WO | 2005094588 A1 | 10/2005 | |

OTHER PUBLICATIONS

Ramsey et al.,South. J. Appl. Forestry, Jan. 2012,36(4): 204-210.*
Ramset et al. (Cogongrass (*Imperata cylindrica*) Control with Imazapyr and Glyphosate Combined with and without Four Adjuvants, Southern Journal of Applied Forestry, Jan. 2012, 36(4): 204-210.*
International Search Report and Written Opinion of the International Searching Authority dated Mar. 23, 2015, which issued during prosecution of International Application No. PCT/FR2015/050162.
Ramsey, et al. "Cogongrass (*Imperata cylindrica*) Control with Imazapyr and Glyphosate Combined with and without Four Adjuvants" Southern Journal of Applied Forestry, Jan. 2012, 36(4):204-210.
Rubiales, et al. "Innovations in parasitic weeds management in legume crops. A review" Agronomy for Sustainable Development, Apr. 2012, 32:433-449.
Komprobst, J.M.; "Phaephyceae (Brown Algae)"; Encyclopedia of Marine Natural Products, Second Edition; 2014; pp. 417-484; available online at https://www.wiley.com/en-us/Encylopedia+of+Marine+Natural+Products%2C+2nd%2C+Greatly+Enlarged+Edition-p-9783527334292.

* cited by examiner

*Primary Examiner* — Johann R Richter
*Assistant Examiner* — Courtney A Brown
(74) *Attorney, Agent, or Firm* — CANTOR COLBURN LLP

(57) ABSTRACT

The present invention relates to a composition comprising a selective herbicide, an algal extract and manganese and/or a silicate, to the use of an algal extract, optionally combined with manganese and/or a silicate, to detoxify plants subjected to a treatment by a selective herbicide and to a method for selective herbicide treatment of a crop comprising the simultaneous, combined or sequential application of a selective herbicide and an algal extract, optionally combined with manganese and/or a silicate.

15 Claims, No Drawings

COMPOSITION COMPRISING A SELECTIVE HERBICIDE AND AN ALGAL EXTRACT, USE OF AN ALGAL EXTRACT FOR DETOXIFYING PLANTS SUBJECTED TO TREATMENT WITH A SELECTIVE HERBICIDE

RELATED APPLICATIONS AND INCORPORATION BY REFERENCE

This application is a US national stage 371 application of International Patent Application No. PCT/FR2015/050162 filed Jan. 23, 2015, which published as PCT Publication No. WO 2015/110763 on Jul. 30, 2015, which claims benefit of French Patent Application No. 14 50622 filed on Jan. 24, 2014 and U.S. Provisional Application No. 61/931,067 filed on Jan. 24, 2014. The contents of the aforementioned applications are hereby incorporated by reference.

Increasing yields is a core concern for farmers. The yield depends greatly on the proper development of the plant and consequently on its growth and also its good health.

To ensure a satisfactory yield, herbicides are used to remove adventitious plants, or weeds.

In the present invention, "herbicide" refers to any active substance, or any composition comprising an active substance, which has the property of destroying or limiting the growth of any plant species. A herbicide is said to be selective when it is effective on weeds and tolerated by the cultivated species. Within the context of the present invention, "selective herbicide" is also used to refer to a total herbicide used on a crop variety which has been made resistant to total herbicides. Thus, within the invention, glyphosate, which is a total herbicide, is considered as a selective herbicide when applied to a glyphosate-resistant soybean variety in the cultivation of glyphosate-resistant soybean.

Even though the selectivity of these herbicides is guaranteed, they are not entirely benign for the crop but have a certain toxicity with regard to this crop. This toxicity is too weak to lead to the destruction of the crop, but hinders or slows its development for a certain period of time. This is because the herbicides used in intensive cultivation, although selective, cause significant stress to the crops, which is reflected especially in a yellowing of their chlorophyll-containing parts after treatment by the herbicide. The crop yield is thereby reduced compared to a crop which has not been treated by a selective herbicide. There is therefore a need for a composition which has the properties of a selective herbicide, but the negative effects of which on the crop are reduced or even negligible.

The present inventors have found that an algal extract, preferably with manganese and/or silicate, makes it possible to minimize the toxicity of a selective herbicide and thus to improve the yield of crops treated by this selective herbicide.

Thus, the invention relates to a composition comprising a selective herbicide and an algal extract. It also relates to a composition comprising a selective herbicide and manganese and/or a silicate.

In the composition according to the invention, the algal extract originates from algae, especially brown algae (Phaeophyceae) and in particular from Fucales or Laminariales, preferably of *Ascophyllum nodosum* type.

The algal extracts used in the composition according to the invention may be obtained by a method chosen from the methods described by the applicant in patent applications WO84/02652, EP0218770 and EP0538091, the contents of which are incorporated by reference.

Such an algal extract may be an extract of *Ascophyllum nodosumsold* by the applicant.

The composition according to the invention also comprises either manganese or a silicate or a mixture of manganese and silicate.

The silicate used in the composition is a silicate of aluminum, potassium or magnesium. Preferably, the silicate is a potassium silicate.

The manganese used in the composition is a manganese salt, such as chloride, carbonate, nitrate or sulfate, or else chelated manganese, such as manganese-EDTA or manganese-citrate. Preferably, the manganese is manganese-EDTA.

The selective herbicide used in the composition according to the invention is chosen from the group comprising selective herbicides used in the cultivation of conventional soybean varieties, of corn, of wheat, of rapeseed, or varieties of these various crops made resistant by genetic modification. Mention may be made, by way of example, of glyphosate used in the cultivation of soybean varieties made resistant to glyphosate, dimethenamid-P (sold by BASF under the trade name Outlook®) used in the cultivation of conventional soybean varieties or Imazaquin (sold by BASF under the trade name Scepter®) used in the cultivation of conventional soybean varieties.

Preferably, the composition according to the invention comprises glyphosate in the free form or salt form, especially the potassium, sodium, ammonium, trimethylsulfonium, monoethanolammonium, isopropylammonium or triazolamine salt.

The composition used in the method according to the invention may be in liquid form, powder form, granule form, water-soluble pellet form, etc.

Depending on the form used, the composition may also comprise formulation additives and adjuvants conventionally used in herbicidal compositions, especially wetting agents, dispersants, emulsifiers, dyes, diluents, supports, etc.

The composition may also be in a mixed form comprising, in separate packages, the selective herbicide on the one hand and in another package the algal extract with optionally the manganese and/or the silicate. According to one particular embodiment, in this mixed form, each of the packages contains a composition in a different form (liquid, pulverulent, granules, etc.).

The amounts of the various constituents will be adapted to the selective herbicide used in the composition.

According to one particular embodiment, the composition comprises:
- 10 to 90%, preferably 20 to 85%, more preferentially 50 to 80% of selective herbicide;
- 5 to 50%, preferably 10 to 40%, more preferentially 15 to 30% of algal extract;
- 0 to 25%, preferably 2 to 20%, more preferentially 5 to 15% of manganese;
- 0 to 25%, preferably 2 to 20%, more preferentially 5 to 15% of silicate;
- 5 to 85%, preferably 10 to 70%, more preferentially 15 to 60% of adjuvants and additives;

the percentages being percentages by weight of the total weight of the composition.

The detoxifying compositions included herein comprise no microbial strains.

According to one particular embodiment, the selective herbicide is glyphosate. The composition is then chosen from the following compositions of active substances: Glyphosate/algal extract;

Glyphosate/algal extract/silicate;
Glyphosate/algal extract/manganese;
Glyphosate/algal extract/manganese/silicate.

These compositions may of course also comprise formulation additives and adjuvants.

In these compositions, the weight ratio between the constituents is as follows:
Glyphosate/algal extract: 90/10-50/50, preferably 80/20-50/50;
Glyphosate/algal extract/silicate: 90/5/5-50/25/25, preferably 80/10/10-40/20/40;
Glyphosate/algal extract/manganese: 95/5/5-50/25/25, preferably 80/10/10-40/20/40;
Glyphosate/algal extract/manganese/silicate: 90/5/2.5/2.5-50/30/10/10, preferably 80/10/5-5-50/30/10/10.

The invention also relates to the use of an algal extract, combined with manganese and/or a silicate, to detoxify plants subjected to a treatment by a herbicide.

Without wishing to be bound by any theory, the inventors believe that the action of the algal extract combined with manganese and/or a silicate makes it possible to reduce the toxicity inflicted by the selective herbicide on the treated crop, by limiting the action of the harmful substances on the crop or by promoting evacuation of the harmful substances that the crop may have absorbed during its treatment by the selective herbicide. In the present invention, no distinction will be made between detoxification of the plants or reduction of the toxicity related to the application of the herbicide.

The algal extract and the silicate are as defined above.

The use according to the invention is entirely suitable for plants chosen from the group comprising agronomically useful plants and ornamental plants.

The agronomically useful plants are chosen from the group of the angiosperms comprising Apiaceae, Asteraceae, Brassicaceae, Chenopodiaceae, Convulvulaceae, Cucurbitaceae, Fabaceae, Liliaceae, Polygonaceae, Rosaceae, Solanaceae, Poaceae and Vitaceae.

Most particularly, according to the invention, an algal extract is used to detoxify soybean of a glyphosate-resistant variety subjected to a treatment by glyphosate. In this particular embodiment, the algal extract is applied by spraying at a rate of from 0.1 to 2.0 kg/ha, preferably from 0.3 to 1.5 kg/ha of soybean to be treated.

According to another embodiment, a composition chosen from compositions comprising algal extract/silicate; algal extract/manganese; algal extract/manganese/silicate is used to detoxify plants subjected to a treatment by a selective herbicide.

These compositions may be formulated in liquid form or solid form by means of adjuvants and additives conventionally used for herbicides.

In these compositions, the weight ratio between the active constituents is as follows:
algal extract/silicate: 80/20-20/80, preferably 60/40-30/70, more preferentially about 50/50;
algal extract/manganese: 80/20-20/80, preferably 60/40-30/70, more preferentially about 50/50;
algal extract/manganese/silicate: 80/10/10-40/30/30, preferably 60/20/20-50/25/25.

These compositions are applied by spraying onto the crops to be treated. The application dose will of course depend on the nature of the crop and on the selective herbicide with which this crop has been treated. For example, these compositions may be applied at a rate of 0.1 to 10 kg/ha, preferably from 0.5 to 8 kg/ha, and more preferentially still from 1 to 5 kg/ha of crop to be treated.

This use is carried out after the treatment by the selective herbicide or simultaneously to the treatment by the selective herbicide.

The invention also relates to a method for selective herbicide treatment of a crop comprising the simultaneous, combined or sequential application of a selective herbicide and an algal extract, optionally combined with manganese and/or a silicate.

Most particularly, the invention relates to a method for treating soybean by glyphosate comprising the simultaneous, combined or sequential application of glyphosate and of algal extract.

The method according to the invention may be carried out on agronomically useful plants and ornamental plants. Such plants are those mentioned above in connection with the use.

The application doses and the means of application of course depend on the species of plant to be treated, and on its stage of development.

The method according to the invention may be carried out with a composition as described above.

When the method is carried out by sequential application, the time separating the application of the selective herbicide from the application of the algal extract, optionally combined with manganese and/or a silicate, must not be too long, so as to limit the toxic effect of the selective herbicide on the crop. Preferably, the two applications should only be separated in time by a few days.

The invention will be described in more detail below by means of the following examples which are given solely by way of illustration.

EXAMPLES

In the following examples, the algal extract used is an extract of *Ascophyllum nodosum* sold by Goëmar. This algal extract is denoted ALG.

The following products, with the acronyms given between brackets, are also used:
Glyphosate 360 (Gly) sold by Syngenta;
Manganese-EDTA complex (Mn);
Potassium silicate (Ksi);
Dimethenamid-P (Out) sold under the trade name Outlook® by BASF;
Imazaquin (Scep) sold under the trade name Scepter® by BASF.

Example 1

Treatment of a Glyphosate-Resistant Soybean

Glyphosate-resistant soybean was planted in a greenhouse and left to grow until the 5-leaf stage. It was separated into different batches, which were each treated by spraying with the following different compositions:

Glyphosate 360 (Gly), algal extract (ALG), manganese-EDTA (Mn) and potassium silicate (KSi), alone or in mixtures in the amounts given in the table below. A control batch was also cultivated, onto which water was sprayed.

4 weeks after treatment, the phytotoxicity of the treatments was assessed on the basis of the surface area of the leaves on which tissue necrosis was observed relative to the total surface area of the leaves (phytotoxicity) and on the basis of the percentage of plants having at least one necrosed leaf.

| Batch no. | Treatment | Sprayed composition (% w/v) | Necrosed surface area (in %) | Plants having a necrosed leaf (in %) |
|---|---|---|---|---|
| 0 | Untreated control | 100% water | 0 | 0 |
| 1 | Gly | 1% | 20 | 65 |
| 2 | ALG | 0.25% | 0 | 0 |
| 3 | ALG | 0.5% | 0 | 0 |
| 4 | Mn | 0.25% | 0 | 0 |
| 5 | Mn | 0.5% | 0 | 0 |
| 6 | KSi | 0.5% | 0 | 0 |
| 7 | KSi | 1% | 0 | 0 |
| 8 | Gly + ALG | 1% + 0.25% | 15 | 36 |
| 9 | Gly + ALG | 1% + 0.5% | 12 | 34 |
| 10 | Gly + Mn | 1% + 0.25% | 18 | 55 |
| 11 | Gly + Mn | 1% + 0.5% | 15 | 48 |
| 12 | Gly + KSi | 1% + 0.5% | 15 | 40 |
| 13 | Gly + KSi | 1% + 1% | 12 | 34 |
| 14 | Gly + ALG + KSi | 1% + 0.25% + 0.5% | 8 | 20 |
| 15 | Gly + ALG + KSi | 1% + 0.5% + 1% | 1 | 12 |
| 16 | Gly + ALG + Mn | 1% + 0.25% + 0.25% | 5 | 15 |
| 17 | Gly + ALG + Mn | 1% + 0.5% + 0.5% | 1 | 10 |

Example 2

Treatment of a Conventional Soybean with Scepter®

Conventional soybean (that is to say not genetically modified and therefore not resistant to glyphosate) was planted in a greenhouse and left to grow until the 5-leaf stage. It was separated into different batches, which were each treated by spraying with the following different compositions:

Scepter® (Scep), algal extract (GA142), manganese-EDTA (Mn) and potassium silicate (KSi), alone or in mixtures in the amounts given in the table below. A control batch was also cultivated, onto which water was sprayed.

4 weeks after treatment, the phytotoxicity of the treatments was assessed on the basis of the surface area of the leaves on which tissue necrosis was observed relative to the total surface area of the leaves (phytotoxicity) and on the basis of the percentage of plants having at least one necrosed leaf.

| Batch no. | Treatment | Sprayed composition (% w/v) | Necrosed surface area (in %) | Plants having a necrosed leaf (in %) |
|---|---|---|---|---|
| 0 | Untreated control | 100% water | 0 | 0 |
| 1 | Scep | 0.1% | 18 | 55 |
| 2 | GA142 | 0.25% | 0 | 0 |
| 3 | GA142 | 0.5% | 0 | 0 |
| 4 | Mn | 0.25% | 0 | 0 |
| 5 | Mn | 0.5% | 0 | 0 |
| 6 | KSi | 0.5% | 0 | 0 |
| 7 | KSi | 1% | 0 | 0 |
| 8 | Scep + GA142 | 0.1% + 0.25% | 12 | 44 |
| 9 | Scep + GA142 | 0.1% + 0.5% | 9 | 39 |
| 10 | Scep + Mn | 0.1% + 0.25% | 18 | 49 |
| 11 | Scep + Mn | 0.1% + 0.5% | 15 | 49 |
| 12 | Scep + KSi | 0.1% + 0.5% | 15 | 41 |
| 13 | Scep + KSi | 0.1% + 1% | 12 | 44 |
| 14 | Scep + GA142 + KSi | 0.1% + 0.25% + 0.5% | 8 | 20 |
| 15 | Scep + GA142 + KSi | 0.1% + 0.5% + 1% | 2 | 15 |
| 16 | Scep + GA142 + Mn | 0.1% + 0.25% + 0.25% | 5 | 11 |
| 17 | Scep + GA142 + Mn | 0.1% + 0.5% + 0.5% | 1 | 10 |

Example 3

Treatment of a Conventional Soybean with Outlook®

Conventional soybean (that is to say not genetically modified and therefore not resistant to glyphosate) was planted in a greenhouse and left to grow until the 5-leaf stage. It was separated into different batches, which were each treated by spraying with the following different compositions:

Outlook® (Out), algal extract (ALG), manganese-EDTA (Mn) and potassium silicate (KSi), alone or in mixtures in the amounts given in the table below. A control batch was also cultivated, onto which water was sprayed.

4 weeks after treatment, the phytotoxicity of the treatments was assessed on the basis of the surface area of the leaves on which tissue necrosis was observed relative to the total surface area of the leaves (phytotoxicity) and on the basis of the percentage of plants having at least one necrosed leaf.

| Batch no. | Treatment | Sprayed composition (% w/v) | Necrosed surface area (in %) | Plants having a necrosed leaf (in %) |
|---|---|---|---|---|
| 0 | Untreated control | 100% water | 0 | 0 |
| 1 | Out | 0.5% | 20 | 50 |
| 2 | ALG | 0.25% | 0 | 0 |
| 3 | ALG | 0.5% | 0 | 0 |
| 4 | Mn | 0.25% | 0 | 0 |
| 5 | Mn | 0.5% | 0 | 0 |
| 6 | KSi | 0.5% | 0 | 0 |
| 7 | KSi | 1% | 0 | 0 |
| 8 | Out + ALG | 0.5% + 0.25% | 15 | 44 |
| 9 | Out + ALG | 0.5% + 0.5% | 11 | 37 |
| 10 | Out + Mn | 0.5% + 0.25% | 18 | 49 |
| 11 | Out + Mn | 0.5% + 0.5% | 16 | 49 |
| 12 | Out + KSi | 0.5% + 0.5% | 15 | 39 |
| 13 | Out + KSi | 0.5% + 1% | 12 | 44 |
| 14 | Out + ALG + KSi | 0.5% + 0.25% + 0.5% | 10 | 20 |
| 15 | Out + ALG + KSi | 0.5% + 0.5% + 1% | 8 | 20 |
| 16 | Out + ALG + Mn | 0.5% + 0.25% + 0.25% | 5 | 10 |
| 17 | Out + ALG + Mn | 0.5% + 0.5% + 0.5% | 1 | 8 |

As can be seen in the tables for examples 1 and 3 above, evidence of phytotoxicity is observed in batches 1 (treatment with selective herbicide). Batches 8 and 9, treated with a mixture of herbicide and algal extract, have less evidence of phytotoxicity. Batches 14-17, treated with a mixture of herbicide/algal extract/manganese-EDTA or herbicide/algal extract/potassium silicate, have entirely reduced evidence of phytotoxicity.

Thus, compositions of algal extract/manganese or algal extract/silicate notably reduce the phytotoxicity of the selective herbicide used in the treatment of the soybean.

The invention claimed is:

1. A detoxifying composition comprising a selective herbicide, an algal extract, and either manganese, a silicate or a mixture of manganese and a silicate, wherein the composition comprises
    20 to 80% of the selective herbicide, wherein the selective herbicide is glyphosate, dimethenamide-p or imazaquin;
    5 to 50% of the algal extract, wherein the algal extract is from *Ascophyllum nodosum*;
    2 to 20% of the manganese, silicate, or both, wherein the silicate comprises potassium silicate, and wherein the manganese comprises manganese EDTA; and
    10 to 70% of an adjuvant and/or an additive selected from the group consisting of wetting agents, dispersants, emulsifiers, dyes, diluents, supports, and combinations thereof;
    wherein the percentages are percentages by weight of the total weight of the composition, and
    wherein the composition comprises no microbial strains.

2. The composition of claim 1, wherein the selective herbicide is glyphosate and having the following mass ratios:
    glyphosate/algal extract/silicate 90/5/5-50/25/25;
    glyphosate/algal extract/manganese 95/5/5-50/25/25; or
    glyphosate/algal extract/manganese/silicate 90/5/2.5/2-5-50/30/10/10.

3. A method of detoxifying a plant treated with a selective herbicide, comprising administering to the plant the composition of claim 1.

4. The method as claimed in claim 3, wherein that the plant is an agronomically useful plant or an ornamental plant.

5. The method of claim 3, wherein the plant is a glyphosate-resistant soybean treated with glyphosate.

6. A method of selective herbicide treatment of a crop comprising the simultaneous, combined or sequential application of a selective herbicide and an algal extract, combined with manganese and/or a silicate, and an adjuvant and/or an additive,
    wherein the silicate comprises potassium silicate; and the manganese comprises manganese EDTA,
    wherein the selective herbicide is glyphosate, dimethenamide-p, or imazaquin,
    wherein the algal extract is from *Ascophyllum nodosum*,
    wherein the adjuvant and/or additive is selected from the group consisting of wetting agents, dispersants, emulsifiers, dyes, diluents, supports, and combinations thereof, and
    wherein the method provides reduced phytotoxicity compared to a comparative treatment with no algal extract,
    wherein no microbial strains are applied.

7. The method of claim 6, wherein the crop is soybean.

8. The composition as claimed in claim 1, comprising:
    5 to 40% of the algal extract;
    2 to 20% of the manganese; and
    2 to 20% of the silicate.

9. The composition as claimed in claim 8, comprising:
    5 to 30% of the algal extract;
    2 to 15% of the manganese; and
    2 to 15% of the silicate.

10. The composition of claim 2, wherein the selective herbicide is glyphosate and having the following mass ratios:
    glyphosate/algal extract/silicate 80/10/10-40/20/40;
    glyphosate/algal extract/manganese 80/10/10-40/20/40; or
    glyphosate/algal extract/manganese/silicate 80/10/5/5-50/30/10/10.

11. The method of claim 3, wherein the composition is applied at a rate of 0.1 to 10 kg/ha.

12. The method of claim 3, wherein the selective herbicide is glyphosate and the following mass ratios are applied:
    glyphosate/algal extract/silicate 90/5/5-50/25/25;
    glyphosate/algal extract/manganese 95/5/5-50/25/25; or
    glyphosate/algal extract/manganese/silicate 90/5/2.5/2-5-50/30/10/10.

13. The method of claim 6, wherein the selective herbicide is glyphosate and the following mass ratios are applied:
    glyphosate/algal extract/silicate 90/5/5-50/25/25;
    glyphosate/algal extract/manganese 95/5/5-50/25/25; or
    glyphosate/algal extract/manganese/silicate 90/5/2.5/2-5-50/30/10/10.

14. A method of detoxifying a plant, comprising administering the composition of claim 1 to the plant at a rate of 0.1 to 10 kg/ha, wherein the composition provides reduced phytotoxicity compared to a comparative composition with no algal extract.

15. The method of claim 14, wherein the crop is soybean.

* * * * *